L. Guinnip. Horse Collar.

No. 113,161. Patented Mar 28 1871.

Witnesses:
E. Wolff
Wm H. C. Smith

Inventor:
L. Guinnip.
per Munn & Co
Attorneys.

UNITED STATES PATENT OFFICE.

LYMAN GUINNIP, OF DANVILLE, ILLINOIS.

Letters Patent No. 113,161, dated March 28, 1871.

IMPROVEMENT IN HORSE-COLLARS.

The Schedule referred to in these Letters Patent and making part of the same.

*To all whom it may concern:*

Be it known that I, LYMAN GUINNIP, of Danville, in the county of Vermillion and State of Illinois, have invented a new and improved Horse-Collar; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
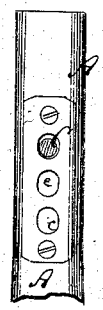
Figure 1 represents a face view of part of my improved horse-collar.
Figure 2:
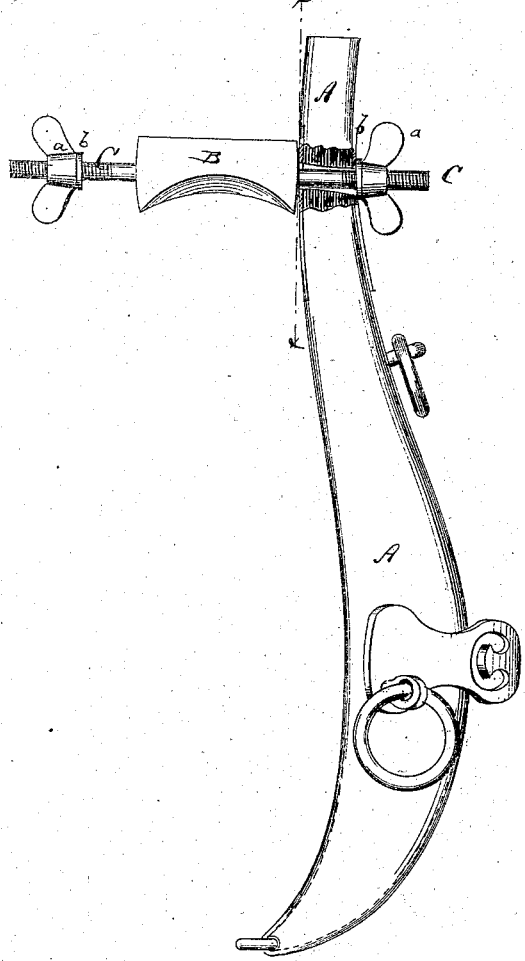
Figure 2 is a detail section of the same taken on line x x, fig. 1.

This invention relates to certain improvements in wooden horse-collars, and particularly in the construction and application of the upper bearing-blocks in relation to the side sections, whereby said sections have an oscillating motion, to adapt them to the position or movement of the animal's shoulders, the sections being also prevented from rolling or turning so as to change their bearing on the shoulders. The bearing-block may likewise be vertically adjusted, and the side sections adjusted laterally at the top, when desired, all as hereinafter described.

A in the drawing is one of the two side sections of a horse-collar, made of wood, and provided with all the necessary appliances for receiving the traces and straps.

B is the upper cross-piece or bearing-block of the same.

The bearing-block is made of wood or other suitable material, and perforated longitudinally to receive a bolt, C, whereby it is secured to the side sections.

The bolt passes through apertures in the side sections, and receives nuts or taps *a a* at the ends, as shown. Keys or other suitable fastening devices may be substituted for these.

Washers *b*, of suitable material, may be interposed between the nuts *a* and side pieces.

The side sections have a series of apertures, *c c*, for the reception of the bolt, so that thereby the bearing-block may be vertically adjusted to fit different-sized necks of horses.

Washers may be employed to fill the space between the abutting ends of the block B and the side sections, when necessary to adjust said sections laterally to fit the necks of different animals.

The bearing-block is longer at the lower than at the upper face, so that its ends are somewhat beveled, but also rounded, as shown. The beveling provides for the proper inclination of the side pieces howsoever the bearing-block may be vertically adjusted.

The apertures *c* in the side sections are somewhat enlarged, and inclined as in fig. 1, so as, together with the curved ends, to allow a more open or close adjustment of the lower part of the collar to fit different animals. The ends of the bearing-block being beveled, it follows that the block in part supports the bolt which again sustains the block. Thus one takes the strain from the other.

The smooth faces of the abutting ends of the bearing section B and the inside of the upper parts of side sections A A, corresponding to each other, allow free action backward and forward to all the sections, independent of each other. Thus the side sections each work with the shoulders of the animal at their lower ends, and are at the same time prevented from rolling so as to change their bearing on both neck and shoulders.

Having thus described my invention,

I claim as new and desire to secure by Letters Patent—

An improved horse-collar, consisting essentially of the side sections A A and bearing-block B, arranged to operate substantially as set forth.

LYMAN GUINNIP.

Witnesses:
BENJAMIN PALMER,
MATTHEW JONES.